July 26, 1932.   J. A. MILLER   1,869,269
CORN HARVESTER
Filed Jan. 31, 1931   5 Sheets-Sheet 1
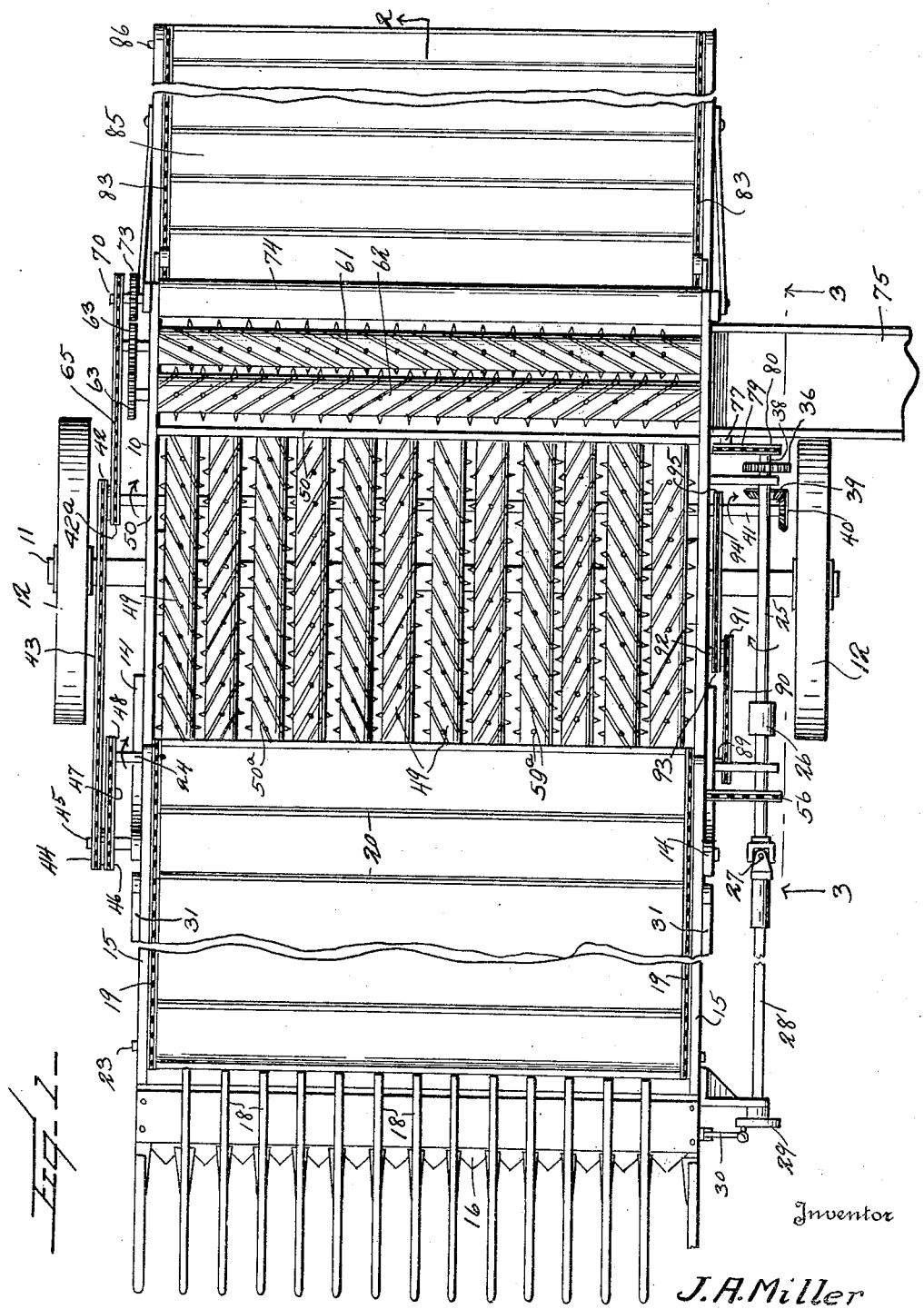

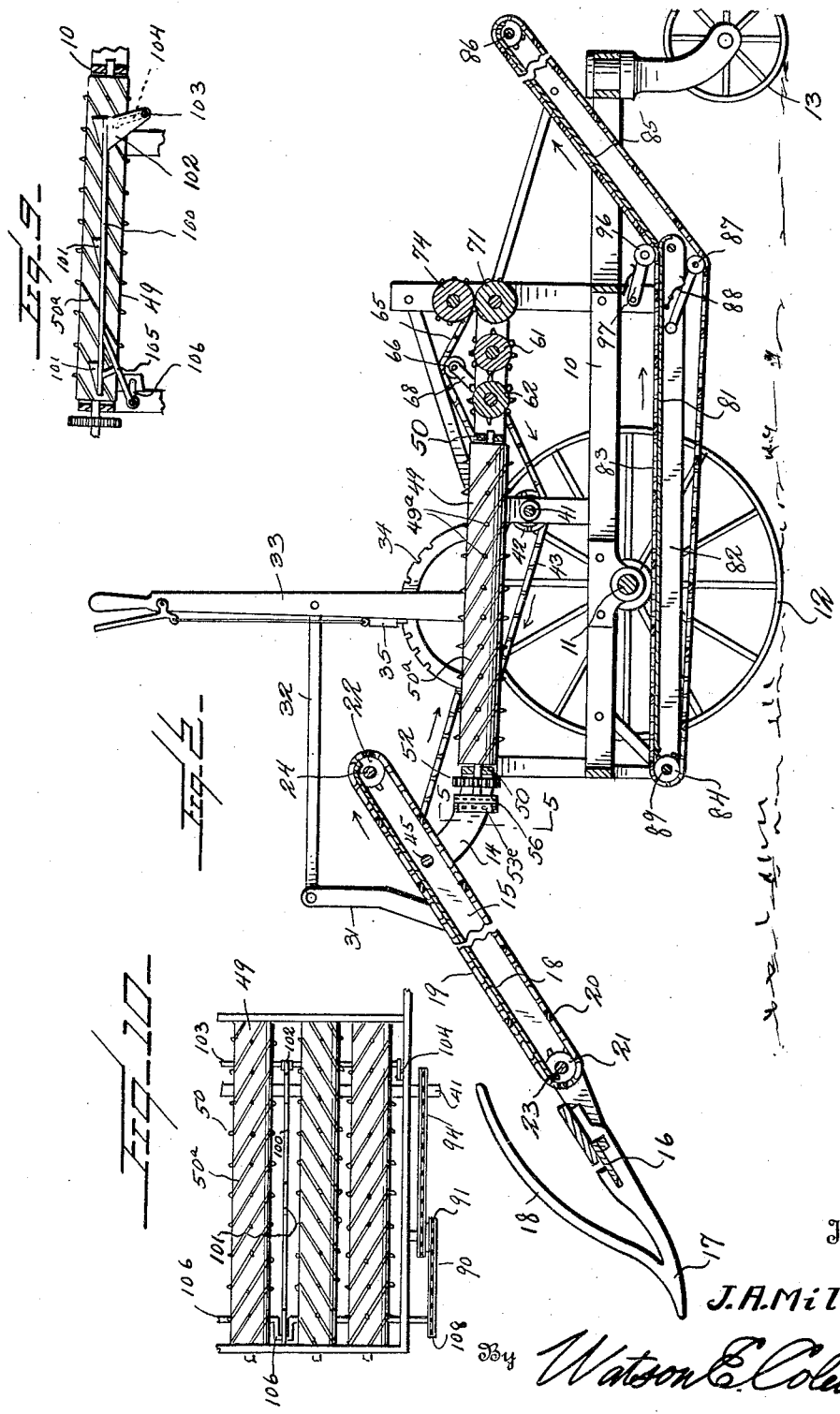

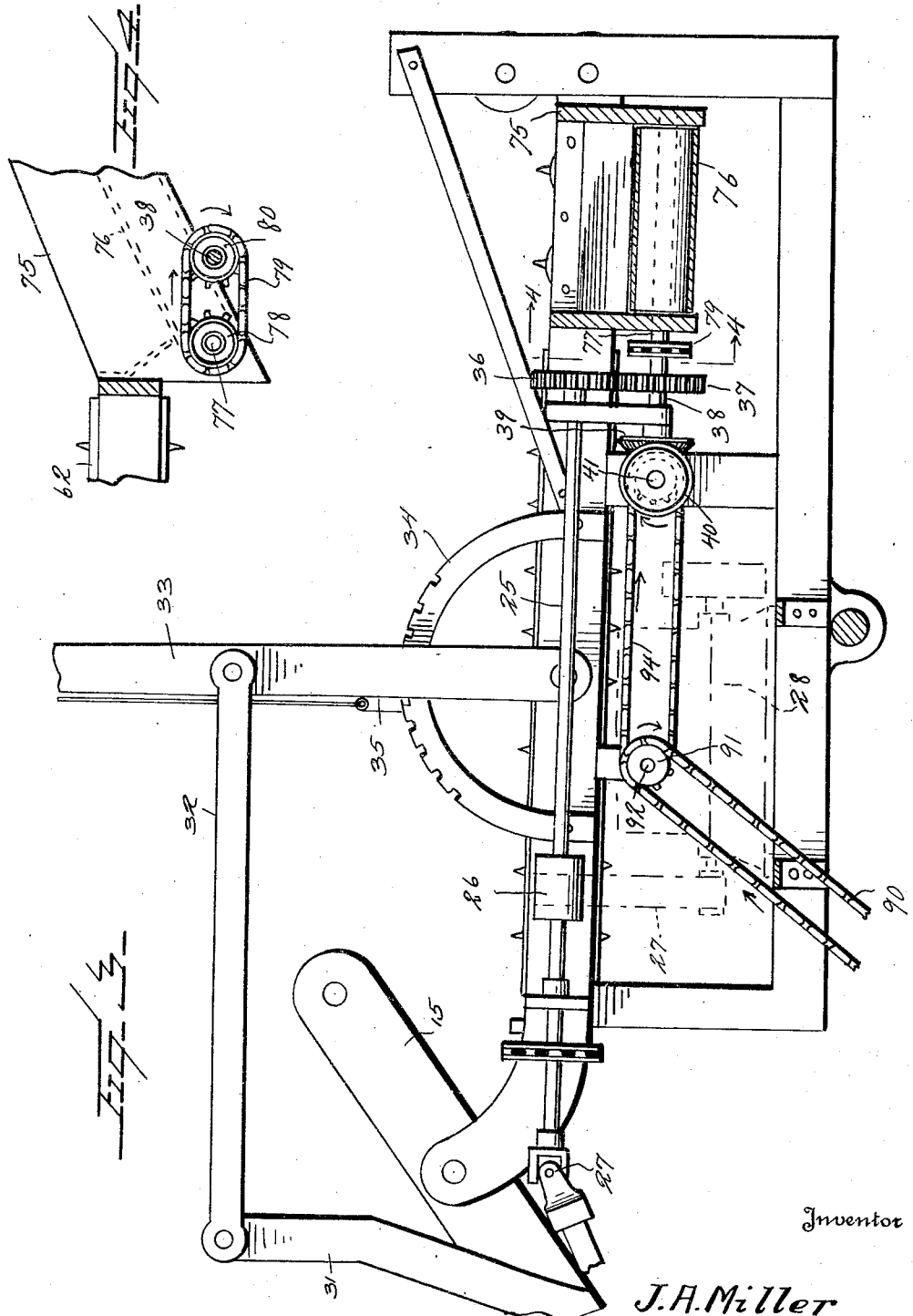

July 26, 1932.  J. A. MILLER  1,869,269
CORN HARVESTER
Filed Jan. 31, 1931  5 Sheets-Sheet 4
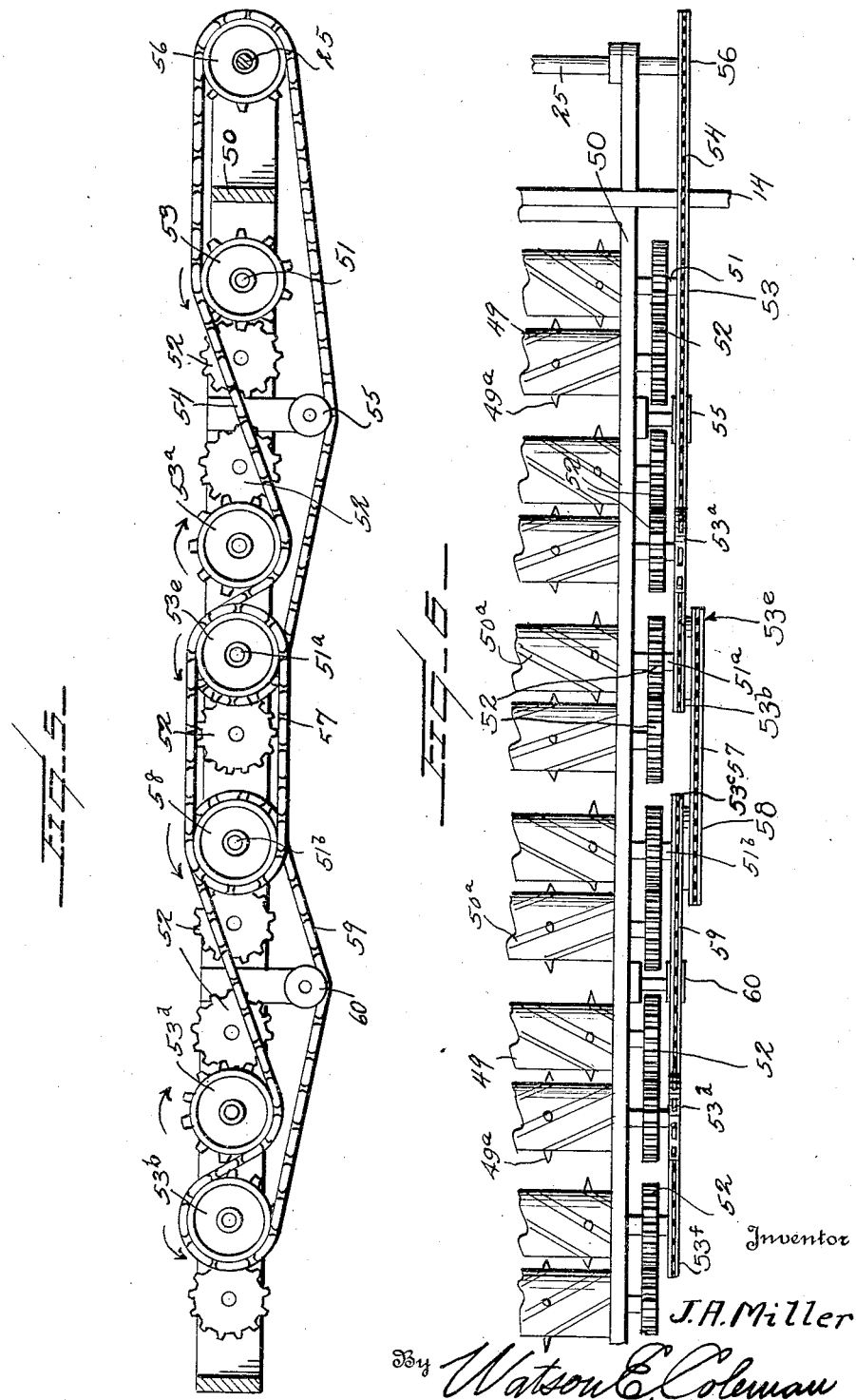

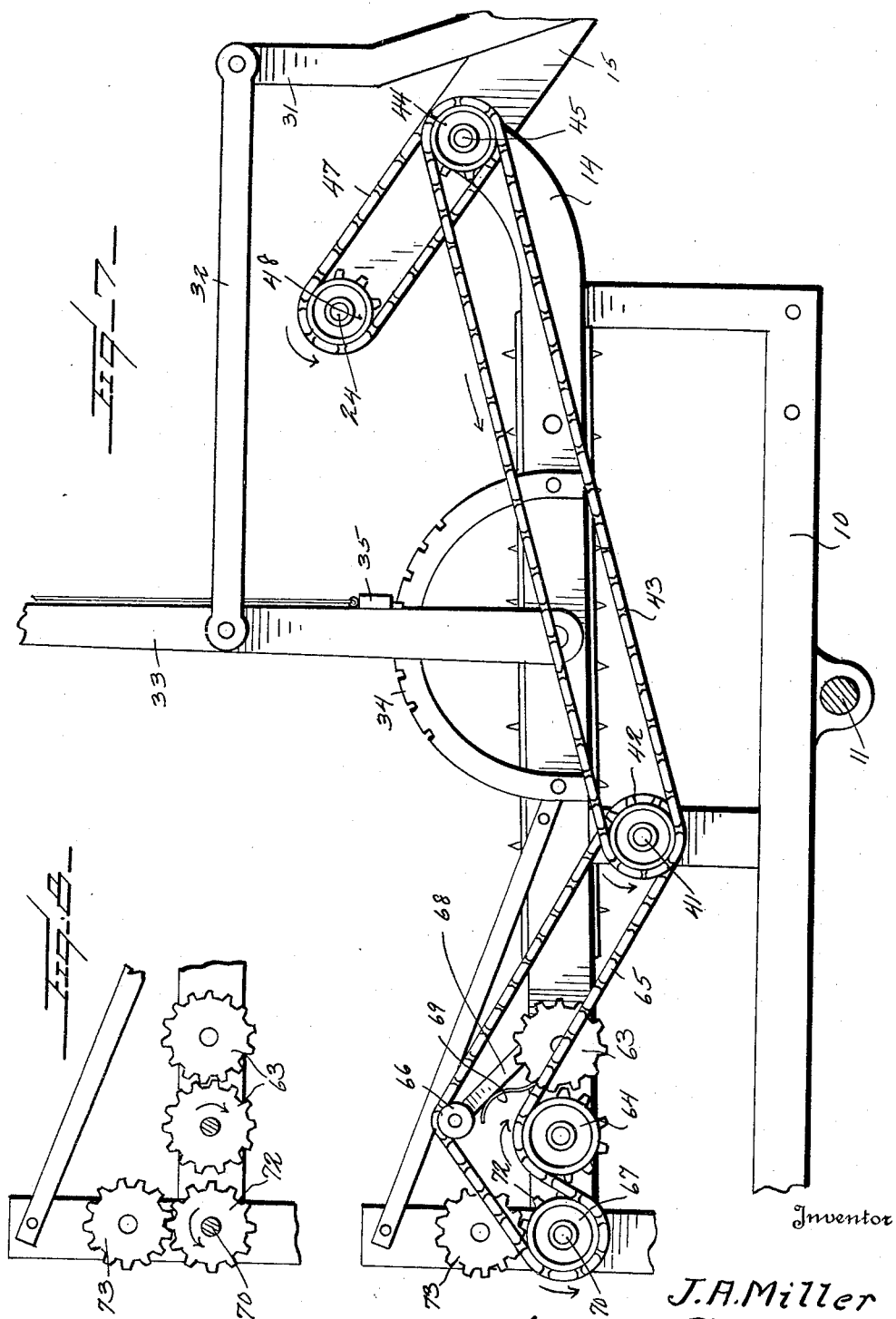

Patented July 26, 1932

1,869,269

UNITED STATES PATENT OFFICE

JACOB A. MILLER, OF GENOA, COLORADO

CORN HARVESTER

Application filed January 31, 1931. Serial No. 512,695.

This invention relates to harvesting machines and particularly to machines for harvesting corn and in which the ears are husked and the leaves stripped from the stalk, the ears snapped off and the stalks discarded.

In Western States, a great deal of relatively short corn is raised. Much of this corn grows very close to the ground and oftentimes it lies over on the ground and one of the principal objects of my invention is to provide a corn harvesting machine with means whereby this corn which is lying upon the ground may be picked up, the stalk cut off and the stalk with its ears discharged to the husking rolls, snapping rolls, etc.

A further object in this connection is to provide means whereby the fingers with the cutting knife may be raised or lowered to suit the conditions of any particular field of corn, and a further object is to provide a machine for this purpose which is very simple and is relatively cheap to operate.

A further object is to provide husking rollers and snapping rollers immediately above the husking rollers, thereby eliminating extra elevators and conveyors which are otherwise necessary, and provide means whereby many ears of corn are shocked before they get to the snapping rollers.

A further object is to provide a feed carrier attachment which may be readily applied to the harvester and whereby leaves and stalks may be saved and conveyed to a wagon.

Other objects will appear in the course of the following description.

My invention is illustrated in the accompanying drawings, wherein:—

Figure 1 is a top plan view of a harvester constructed in accordance with my invention;

Figure 2 is a section on the line 2—2 of Figure 1;

Figure 3 is a fragmentary section on the line 3—3 of Figure 1;

Figure 4 is a section on the line 4—4 of Figure 3;

Figure 5 is a section on the line 5—5 of Figure 2;

Figure 6 is a fragmentary top plan view of the construction shown in Figure 5;

Figure 7 is a fragmentary side elevation from the side opposite Figure 3;

Figure 8 is a fragmentary elevation of a portion of Figure 7 with the chain drive removed.

Figures 9 and 10 are respectively sectional plan views of the first series of stripping rolls showing a feeder feeding the material along the rolls.

Referring particularly now to Figures 1 and 2, 10 designates the supporting frame or main frame of the harvester which is supported at its forward end upon the axle 11 carrying the main traction wheels 12.

The rear of the machine is supported upon one or more wheels 13 which are preferably caster wheels. From the main frame extends out the brackets 14 upon which is pivoted a frame supporting an upwardly and rearwardly extending conveyor, the frame being designated 15.

The lower end of this frame carries the usual reciprocating knife bar 16 and is formed with the downwardly extending fingers 17, with the upwardly extending guards 18. These fingers 17 are so formed that they will move easily along the ground or slightly above the same and will lift up any fallen stalks and raise these stalks in such position that the stalks may be cut off close to the ground by the knife bar 16.

I do not wish to be limited to any particular form of elevator mounted upon the frame 15, but I have shown for this purpose the frame 15 as being formed with a deck 18 over which pass the opposed sprocket chains 19, these sprocket chains carrying cross bars 20, which sweep over the upper face of the deck. The sprocket chains 19 are mounted upon sprocket wheels 21 and 22 carried respectively by the shafts 23 and 24. The shaft 24 is the driving shaft of the sprocket chains.

Extending parallel to the length of the frame 10 is a power operated driving shaft 25. This shaft is shown as carrying on it a pulley 26 which, as illustrated in Figure 3, is driven by means of a band 27 from a pulley wheel driven by the engine 28 indicated in dotted lines in Figure 3. This engine may be of any suitable character and disposed in any desired place and, while I have illustrated it as driving the shaft 25 directly through the pulley 26, I do not wish to be limited thereto as the engine might be connected up to intermediate shafting. The forward end of this shaft 25 is connected by means of a universal joint 27 to a shaft section 28 carried in suitable bearings upon the frame 15, this shaft section 28 carrying at its forward end the crank 29 whose wrist pin is operatively connected to the cutter bar by means of the link 30. Any other suitable mechanism may be used for this purpose, however.

The universal joint 27 permits the frame 15 with the conveyor to be tilted into different angular positions, that is, to permit the fingers and the cutter bar to be raised or lowered relative to the ground and for this purpose, as illustrated in Figure 3, I provide the frame 15 with an arm 31 connected by means of a link 32 to a lever 33 operating over an arcuate rack 34 and provided with a hand grip operated bolt 35 coacting with the notches and rack 34 to hold the lever in any adjusted position. By this means, the lower and forward end of the conveyor frame 15 may be raised and lowered to adjust the fingers in proper relation to the ground.

As shown in Figure 3, the shaft 25 is provided at its rear end with a gear wheel 36 meshing with a gear wheel 37 on a shaft 38. This shaft carries upon it the beveled gear wheel 39 meshing with the beveled gear wheel 40 upon a shaft 41 which extends transversely across the frame 10. This shaft 41 carries upon it a sprocket wheel 42 connected by a sprocket chain 43 to a sprocket wheel 44 on a shaft 45, this shaft 45 carrying upon it a sprocket wheel 46 over which a sprocket chain 47 passes to a sprocket wheel 48 on shaft 24, thus driving the chains 19 of the conveyor or elevator. This is shown clearly in Figure 7. Inasmuch as the shaft 45 is coincident with the pivotal axis upon which the conveyor is mounted for vertical swinging movement, it is obvious that the drive will be the same in all positions of this forward conveyor or elevator.

The elevator deck 18 extends upward to a point above and discharges on to a series of longitudinally extending stripping rolls, the rolls being designated 49. The rolls are disposed relatively close together as is usual with stripping rolls and are shown as provided with outwardly projecting pins or prongs 49a as usual.

The shafts 51, 51a, 51b, etc., of the stripping rollers are mounted in suitable bearings in frame members 50 as shown in Figure 2 and at its forward end, each shaft 51, 51a, 51b, 51c, carries a gear wheel 52. The first shaft 51 of the series carries upon it a sprocket wheel 53 and the gear wheel 52 of this shaft meshes with the gear wheel 52 of the next adjacent shaft 51. The next pair of shafts also carry the intermeshing gear wheels 52 and one of these shafts carries a sprocket wheel 53a. The next two shafts are intergeared by the gears 52 but the shaft 51a of the first gear of the next two carries upon it two sprocket wheels 53b and 53e. Passing over sprocket wheel 53, then beneath the sprocket wheel 53a and over and then around the sprocket wheel 53b is a sprocket chain 54, the lower flight of this chain extending beneath an idler pulley 55 and this chain being driven from the sprocket wheel 56 mounted upon the shaft 25 as shown in Figure 5. It will be seen that this sprocket chain which moves in the direction of the arrow, Figure 5 will give a counter-clockwise movement to the sprocket wheel 53 and a clockwise movement to the companion shaft, that it passes beneath the sprocket wheel 53a and thus gives a clockwise movement to this sprocket wheel with a counter-clockwise movement to the other shaft of this pair and that this sprocket chain will give a counter-clockwise movement to the sprocket wheel 53b and the corresponding shaft 51a and a clockwise movement to the corresponding shaft of the pair of shafts. The shaft 51a also carries upon it the sprocket wheel 53e, as previously stated, over which passes a sprocket chain 57 passing around a sprocket wheel 58 on the shaft 51b, which shaft carries a sprocket wheel 53c. The shaft 51b, of course, has a gear wheel 52 meshing with the gear wheel 52 on the next adjacent shaft of the pair. Over the sprocket wheel 53c passes a chain 59, the upper flight of which extends downward and beneath a sprocket wheel 53d and then over and around a sprocket wheel 53b and then down beneath the idler wheel 60. By thus turning the three sprocket chains 54, 57 and 59, a proper rotational movement is given to the pairs of stripping rolls so that the stripping rolls of each pair rotate toward each other and downward. This is obvious from Figures 5 and 6. The action of these stripping rolls is to strip the leaves and in some instances the husks themselves from the corn while the stalks are passing longitudinally over the stripping rolls 49.

For the purpose of pulling the husks off the ears, I provide two transversely extending husking rolls 61 and 62 disposed rearward of the rear ends of the stripping rolls 49. These husking rolls are driven in reverse directions to each other by means of the intermeshing pinions 63 on the shaft of these husking rolls 61. The shaft of one of these husking rolls 61 carries upon it the sprocket wheel 64 as shown in Figure 7. Over this sprocket wheel passes a sprocket chain 65 which passes around the sprocket wheel 42 of shaft 41, then upward and over a sprocket chain tightener wheel 66, then downward and beneath a sprocket wheel 67 mounted on the frame of the machine and then upward and over the sprocket wheel 64 as previously stated. Thus the shaft 41 drives the husking rollers 61 and 62. The belt tightener 66 is mounted upon a pivoted arm 68 urged upward by means of a spring 69 or in any other suitable manner. The sprocket wheel 67 is mounted upon a shaft 70 which carries upon it the lower snapping roll 71. Also mounted upon the shaft 70 is a gear wheel 72 meshing with the gear wheel 73 mounted upon the shaft of an upper snapping roll 74. Thus these two snapping rolls are rotated in reverse directions. As the stalks move rearward, the stalks themselves will pass through or between the snapping rolls 71 and 74 and these rolls will act to snap the ears from the stalk and discharge the ears back on to the husking rolls 61 which, as they rotate, will tear the husks off the ears of corn. These husking rolls will eventually discharge their ears of corn into an elevator 75 (see Figure 4) wherein there is mounted an upwardly extending elevator belt or apron designated 76 and shown in dotted lines in Figure 4. This belt is driven by a lower roller mounted upon a shaft 77. This shaft carries a sprocket wheel 78 over which passes a sprocket chain 79 trained over a sprocket wheel 80 mounted upon a shaft 38. In other words, the driving shaft for the elevator 76 is constituted by the shaft 25 which is driven from the engine.

With the construction that has been heretofore described, it will be seen that as the machine advances through a field of corn, those stalks of corn which have been blown down or which lie close to the earth will be picked up and these stalks, together with the standing stalks of short corn will be cut close to the ground and the stalks with the ears and leaves will pass upward over the deck 18, being carried upward by the conveyor chains. Any suitable conveyor may be used, however, in place of the particular construction shown in Figure 2. The stalks will then drop downward upon the stripping rolls 49 which will tear the leaves from the stalks and in some cases act to partially husk the ears of corn. The stalks will then pass rearward and through the snapping rolls which will prevent the passage of the ears of corn but permit the passage of the stalks and the ears will be snapped off the stalks and become engaged by the husking rolls 61 and 62 which will act to strip the husks from the ears of corn and the ears of corn will be eventually discharged into the elevator 75 and the corn stalks will be discharged rearward of the ground, the leaves or other portions torn off by the husking or stripping rolls 49 will also drop down upon the ground.

It is often the case that a farmer wishes, however, to save the stalks and the leaves torn therefrom for fodder, in which case, I provide means for preventing the discharge of these elements on to the ground and carrying them into a wagon trailing behind the harvester. To this end, I mount below the axle 11 the deck 81 supported upon a frame 82 disposed below the main frame 10 and supported therefrom. Over this deck which is arranged horizontally operates a conveyor designated generally 83 which may be of any suitable construction. This passes at its forward end around sprocket wheels 84. After leaving the rear end of the deck 81, the conveyor extends upward over an upwardly inclined deck 85 and extends over sprocket wheels 86 and then extends downward and forward beneath a tightener roller 87 and then forward to the roller 84. The tightening roller 87 is mounted upon an arm on the frame 82, the arm being urged downward by the spring 88. The sprocket chain which constitutes the conveyor 83, of course, engages the sprocket wheels 84 and 86 and one of these sprocket wheels is driven from the main driving shaft. I have illustrated the shaft of the sprocket wheel 84 as being thus driven. This shaft 89 carries upon it a sprocket wheel engaged by a chain 90. This chain 90, as shown in Figure 3 extends upward and rearward and over a sprocket wheel 91 carried upon a shaft 92 which shaft carries upon it a sprocket wheel 93, over which a sprocket chain 94 passes to a sprocket wheel 95 mounted upon a shaft 41. At the intersection of the deck 81 with the deck 85, a transversely extending roller 96 is provided to bear upon the upper flight of the conveyor, this roller being mounted upon an arm 97 urged downward by a spring.

It will be obvious now that with this construction, the leaves, stalks and other parts, not the ears, which are discharged from the husking rollers and snapping rolls are discharged on to the endless conveyor 83 and will be carried rearward and discharged into a wagon, thus permitting any portion of the corn to be utilized.

It is to be understood, of course, that the rollers 49 and 62 and 74 if desired are to be formed with spirally extending ribs 50a upon which projections or spikes are formed. These helical ribs, therefore, will act to carry any material remaining upon the upper portions of the rolls 49 over toward and eject this material upon the rolls 61 and 62 while these ribs on the rolls 61 and 62 will carry the material toward the elevator 75.

While under normal circumstances these helical ribs 50a will act to carry the material longitudinally along the rolls 49 toward the rear thereof, yet when the machine is going down a hill, for instance, these spiral ribs do not act perfectly for this purpose and under some circumstances, it may be desirable to provide adjunctive means for urging the material on the rollers 49 toward the rear of the machine. For this purpose I provide, as illustrated in Figures 8 and 9 a positive feeding mechanism comprising longitudinally reciprocatable rods 100 having upwardly and forwardly inclined teeth 101. The rods are disposed one between each pair of rolls 49 and the rear ends of these rods are provided with brackets 102 engaged with a transverse rod 103. This transverse rod 103 at its ends is mounted in downwardly extending arms 104 pivoted to the frame 10. The forward ends of all these rods 100 are formed to provide downwardly extending braces or connecting rods 105 connecting with cranks 106 on a shaft 107. This shaft is mounted in bearings and, of course, is disposed below the rolls and at its ends carries a sprocket wheel 108 which is engaged by a sprocket chain 90 heretofore described. It is obvious now that as the shaft 107 is rotated, the feeders 100 will be given an upward and rearward movement and then a downward and forward movement, thus acting intermittently to feed the material that is resting upon the top of the rolls 49 forward and giving it a positive feed toward the husking rolls 61.

I have shown the forward elevator 19 as terminating at a point above the forward ends of the stripping rolls 49. This elevator 19 may terminate at the upper faces of the stripping rollers provided there is a deck or floor to carry the corn over the wheels and chains at the forward end of the stripping rolls. Thus, for instance, these sprocket wheels 22 might be disposed upon the shaft 45 if desired, but care must be taken, under these circumstances, that the corn does not engage with and thus become entangled with the chains driving the stripping rolls.

In the operation of this device, it will be understood that the stripping rolls 49 are intended to take as many stalks and leaves from the corn as possible and in short corn for which this machine is particularly intended, they will take most of the stalks and leaves, leaving the ears of corn nearly husked or entirely so. The rear rollers 61 and 62 are only intended to husk the ears of corn missed by the front rollers 49.

It will be seen that I have provided a corn harvesting machine in which the working parts are assembled to provide a gathering and cutting mechanism which will get very close to the ground and provide a snapping and husking mechanism which will eliminate extra elevators and conveyors and further I have provided a convenient feed saving device.

By reason of its simplicity, this machine may be easily kept in proper working order.

While I have illustrated a construction which I deem to be particularly effective, I do not wish to be limited to this as obviously many changes might be made therein without departing from the spirit of the invention as defined in the appended claims.

I claim:—

1. In a harvester for short corn, a main wheeled frame, a plurality of longitudinal stripping rolls mounted on the frame, a cutter supporting frame mounted on said main frame in advance of said stripping rolls and extending downward and forward, a reciprocatable cutter mounted upon the lower end of the cutter supporting frame, fingers carried thereby and coacting with the cutter, an upwardly and rearwardly extending conveyor mounted on the cutter supporting frame and discharging on to said stripping rolls, manually controlled means for raising or lowering the forward end of said cutter supporting frame, and means for driving said stripping rolls, said elevator and the cutter.

2. In a harvester for short corn, a main wheeled frame, a plurality of pairs of longitudinally extending stripping rolls on the main frame, a cutter supporting frame, pivotally mounted adjacent its upper end on the main frame, and extending downward and forward therefrom, a reciprocating cutter mounted upon the cutter supporting frame, fingers on the cutter supporting frame coacting with the cutter, a conveyor mounted on the cutter supporting frame and discharging on to said stripping rolls, a pair of husking rolls extending at right angles to the stripping rolls and disposed rearward of the stripping rolls and upon which the stripping rolls discharge, and a pair of snapping rolls disposed one above the other rearward of but adjacent the last roll of the husking rolls, and means for driving the conveyor, reciprocating knife, the stripping rolls, the husking rolls and the snapping rolls.

3. In a harvester for short corn, a main wheeled frame, a plurality of pairs of longitudinally extending stripping rolls on the main frame, means for driving the rolls of each pair in opposite directions, a cutter supporting frame pivotally mounted on the main frame in advance of the stripping rolls and normally extending downward and forward and having a plurality of fingers, a reciprocating cutter mounted upon the supporting frame beneath said fingers, a conveyor mounted upon the cutter supporting frame above the cutter, the conveyor extending above the point of pivotal connection to the main frame and discharging on to the stripping rolls, a pair of husking rolls disposed transversely of but adjacent to the rear ends of the stripping rolls, means for rotating said husking rolls in opposite directions, the husking rolls being disposed on a level with the rear ends of the stripping rolls, a pair of snapping rolls disposed one above the other, the lowermost snapping roll being disposed approximately on a level with the husking rolls, means for rotating said snapping rolls in opposite directions, and manually operable means for raising or lowering the forward end of the cutter supporting frame.

4. In a harvester for short corn, a main wheeled frame, a plurality of pairs of longitudinally extending stripping rolls on the main frame, a cutter supporting frame, pivotally mounted adjacent its upper end on the main frame, and extending downward and forward therefrom, a reciprocating cutter mounted upon the cutter supporting frame, fingers on the cutter supporting frame coacting with the cutter, a conveyor mounted on the cutter supporting frame and discharging on to said stripping rolls, a pair of husking rolls extending at right angles to the stripping rolls and disposed rearward of the stripping rolls and upon which the stripping rolls discharge, and a pair of snapping rolls disposed one above the other rearward of but adjacent the last roll of the husking rolls, means for driving the conveyor, reciprocating knife, the stripping rolls, the husking rolls and the snapping rolls, and an elevator on which the husking rolls discharge.

5. In a harvester for short corn, a main wheeled frame, a plurality of pairs of longitudinally extending stripping rolls on the main frame, a cutter supporting frame, pivotally mounted adjacent its upper end on the main frame, and extending downward and forward therefrom, a reciprocating cutter mounted upon the cutter supporting frame, fingers on the cutter supporting frame coacting with the cutter, a conveyor mounted on the cutter supporting frame and discharging on to said stripping rolls, a pair of husking rolls extending at right angles to the stripping rolls and disposed rearward of the stripping rolls and upon which the stripping rolls discharge, and a pair of snapping rolls disposed one above the other rearward of but adjacent the last roll of the husking rolls, means for driving the conveyor, reciprocating knife, the stripping rolls, the husking rolls, and the snapping rolls, an elevator on which the husking rolls discharge, a conveyor operatively supported upon the main frame below the stripping rolls and husking rolls, the elevator extending rearward beyond the snapping rolls and extending upward whereby the leaves, stalks and husks separated from the ears may be carried to a wagon.

In testimony whereof I hereunto affix my signature.

JACOB A. MILLER.